United States Patent Office 3,551,131
Patented Dec. 29, 1970

3,551,131
PLANT GROWTH STIMULANT COMPOSITION
AND PROCESS
John M. Musselman, Brecksville, and Richard D. Schieman, Avon Lake, Ohio, assignors to The Standard Oil Company, Cleveland, Ohio, a corporation of Ohio
No Drawing. Filed Mar. 7, 1968, Ser. No. 711,178
Int. Cl. A01n 9/22
U.S. Cl. 71—82
2 Claims

ABSTRACT OF THE DISCLOSURE

A composition which improves growth of plants when applied thereto, said composition comprising (A) a triazine herbicide, (B) a non-phytotoxic oil and (C) a nitrogen-containing fertilizer.

---

This invention relates to a composition useful in improving growth of plants, said composition being a mixture comprising a herbicide, a certain non-phytotoxic oil and a fertilizer.

Although the present invention is particularly applicable to the cultivation and growing of corn, it will be appreciated that the invention is much broader and embraces cultivation and growing of other useful crops such as grain and sorghum.

This invention provides a composition which enhances the growth of useful crops both in terms of number of plants per acre as well as size of the individual plants. Our composition provides enhanced results in the yield of useful crops in excess of what one would expect from the combined action of each of the components of our compositions.

We have discovered a composition comprising a mixture of (A) a herbicide, preferably of the triazine type, (B) a non-phytotoxic oil, preferably a mineral oil, and (C) a fertilizer, preferably a nitrogen-containing fertilizer. This composition can also contain other materials such as inert diluents, including water, emulsifiers, insecticides, stabilizers and the like which are well known to those skilled in the art.

Herbicide ingredients useful in this invention include the triazines and substituted ureas. Particularly preferred are the triazine herbicides because they are quite effective against a variety of perennial grasses, annual grasses and weeds. Although a triazine herbicide is an essential ingredient, the present invention is not limited to the use of a single herbicide component in our compositions and can include, for instance, well-known herbicides for broadleaf weeds as well.

The non-phytotoxic oil useful in these compositions is preferably a hydrocarbon oil which is composed primarily of paraffins and cycloparaffins. Preferably the non-phytotoxic oil of the present invention contains at least 90% by weight of paraffins and cycloparaffins. Representative non-phytotoxic oils useful in this invention are those which include some or all of the following components:

Paraffins—
 Normal paraffins up to $C_{15}$
 Isoparaffins; namely, dimethyl substituted $C_{12}$ to $C_{17}$ methyl substituted $C_{13}$ to $C_{18}$
Cycloparaffins—
 One ring:
  $C_{15}$ and more ring carbon atoms
  $C_{19}$ and less, normal alkyl cyclopentanes
  $C_{17}$ and less, normal alkyl cyclohexanes
 Two rings:
  $C_5$ and less 1,1-dicyclohexyl alkanes Three rings:
  $C_5$ and less tricycloalkanes
  1,2-dicyclohexyl cyclopropane
 Condensed:
  Octaperhydrophenanthrene
  Perhydrofluorene
  Butyl Decalin
  Perhydropyrenes Fertilizer materials useful in this invention are preferably those which are water soluble and may contain more than one component such as urea, potassium nitrate, sodium nitrate, ammonia, amines, ammonium nitrate, superphosphates, potash, natural organic matter such as guano, digested sludge and the like. Preferred fertilizers are nitrogen-containing fertilizers such as ammonia, urea, ammonium nitrate and mixtures of at least two of same.

The preferred composition of this invention is one which is composed of (A) herbicide, (B) non-phytotoxic oil and (C) fertilizer as well as water and an emulsifier. For instance, a typical composition might be an emulsion of oil in water containing a suitable emulsifying agent, the herbicide component substantially in the oil phase and the fertilizer component substantially in the water phase. Such compositions are readily applied to soil by known techniques of spraying and the like.

The hydrocarbon oils employed in this invention are themselves substantially non-phytotoxic. When used alone they are incapable of killing unwanted vegetation regardless of pre-emergent or post-emergent application.

Herbicides useful in this invention include the triazines such as an aminotriazine, a phenoxy acetic acid, chlorinated esters of terephthalic acid, a picolinic acid, substituted ureas and the like.

Most preferred are the aminotriazines including 2-chloro-4,6-bis-diethylamino-s-triazine
2-chloro-4,6-bis-ethylamino-s-triazine
2-chloro-4-amino-6-ethylamino-s-triazine
2-chloro-4-amino-6-n-propylamino-s-triazine
2-chloro-4-ethylamino-6-isopropylamino-s-triazine
2-chloro-4-amino-6-n-butylamino-s-triazine
2-chloro-4-amino-6-allylamino-s-triazine
2-chloro-4-amino-6-diethylamino-s-triazine
2-chloro-4-methylamino-6-ethylamino-s-triazine
2-chloro-4-methylamino-6-n-propylamino-s-triazine
2-chloro-4-ethylamino-6-n-propylamino-s-triazine
2-chloro-4-ethylamino-6-($\beta$-hydroxy ethylamino)-s-triazine
2-chloro-4-ethylamino-6-diethylamino-s-triazine Most preferred in this invention is 2-chloro-4-ethylamino-6-isopropylamino-s-triazine.

Suitable emulsifiers include cationic emulsiers such as quaternary ammonium compounds; anionic emulsifiers such as fatty acid soaps, long hydrocarbon chain sulfuric acid monoesters, aliphatic sulfonic acids and alkoxyacetic acids; and non-ionic emulsifiers such as alkyl succinic acids, polyethylene glycol ethers of fatty alcohols and polyethylene oxide condensation products.

This invention also contemplates the addition of other ingredients to the system, such as insecticides, nematocides and fungicides.

Specific non-phytotoxic hydrocarbon oils useful in this invention are hydrocarbon recycle oils containing at least 90% of paraffins and cycloparaffins.

Hydrocracker recycle oil is a fairly heavy side stream withdrawn from a hydrocracking unit. Normally the recycle stream, as the name suggests, is fed back into the hydrocracking unit for further cracking. This material has a boiling range of about 500 to about 600° F.

Principal grasses and weeds identified in the soil include alfalfa, timothy, quackgrass, Kentucky blue grass, rye grass, dandelion, curly dock, smartweed, birds food, trefoil, ragweed and horseweed.

EXAMPLE

The following tests were applied to corn planted on 120 acres of plots containing grass and weeds with no tilling. The grass and weeds were treated with the various spray mixtures described below, and the corn was planted within two to three weeks after spray treatment.

Forty gallons per acre of the following spray formulation:

3.0 pounds of atrazine (2-chloro-4-(ethylamino)-6-isopropylamino-s-triazine)
2.0 gallons of isocracker recycle oil containing 10% of an emulsifier
18.0 gallons of 28% nitrogen solution; this solution contained 30.2% water, 31% urea and 38.8% ammonium nitrate
1.0 pound of 2,4-D (2,4-dichloro-phenoxyacetic acid) amine (broadleaf herbicide)
1.0 pound of active chlordane (insecticide)
38.0 gallons water when no nitrogen solution
22.0 gallons water when nitrogen solution used The plots were rectangular and ranged from 0.5 to 1.0 acre in size and contained six rows of corn planted in forty inch rows. Planting rate was 32,000 corn seeds per acre. Soil type was Wooster silt loam.

Fertility of the of the soil as shown in Table I was built up to have a maximum potential for 120 bushels/acre yield of corn on those plants not treated with the extra nitrogen. Potential yield on those plants to which nitrogen solution was applied was 140 bushels of corn per acre. All soils had sufficient applied phosphorus and potassium to eliminate these elements as variables at the potential yield levels.

TABLE I.—FERTILITY

| | | | |
|---|---|---|---|
| 198 pounds N | Broadcast | | |
| 50 pounds N | Soil organic matter | | No nitrogen solution. |
| 11.3 pounds N | Row | | |
| 80 pounds P | Broadcast | | |
| 55.6 pounds P | Row | | |
| 80.0 pounds P | Soil availability | | |
| 110 pounds K | Broadcast | | |
| 55.6 pounds K | Row | | |
| 150.0 pounds K | Soil availability | | |

Potential Yield: 120 bushels/acre

| | | | |
|---|---|---|---|
| 198 pounds N | Broadcast | | |
| 50 pounds N | Soil organic matter | | With nitrogen solution. |
| 11.3 pounds N | Row | | |
| 50.4 pounds N | Nitrogen solution | | |
| 80 pounds P | Broadcast | | |
| 55.6 pounds P | Row | | |
| 80.0 pounds P | Soil availability | | |
| 110 pounds K | Broadcast | | |
| 55.6 pounds K | Row | | |
| 150.0 pounds K | Soil availability | | |

Potential Yield: 140 bushels/acre

The results of the various growing tests are given in Table II.

TABLE II.—FIELD RESULTS

Yield bushels/acre of No. 2 corn

| | |
|---|---|
| Atrazine | 95.1 |
| Atrazine (post $N_2$ solution) [1] | 96.4 |
| Atrazine+$N_2$ solution | 113.3 |
| Atrazine+isocracker recycle fraction | 121.2 |
| Atrazine+isocracker recycle fraction (post $N_2$ solution) [1] | 88.1 |
| Atrazine+isocracker recycle fraction+$N_2$ solution | 142.6 |
| Least significant difference | 7.8 |

[1] After and separate from oil-herbicide application.

In all cases when nitrogen solution was applied separately no increase in corn yield was observed.

Straight atrazine shows some slight response to the nitrogen when combined with the atrazine.

It is apparent from these results that the use of the atrazine-isocracker recycle oil-nitrogen solution produces a synergistic effect producing a yield at the level of the potential yield available from the fertilizer. This indicates no competition from weeds and maximum utilization of fertilizer.

The physical and chemical properties of isocracker recycle oil are given in Table III.

TABLE III.—ISOCRACKER RECYCLE OIL

| | |
|---|---|
| Gravity, ° API | 41.2 |
| Viscosity at 210° F., cs. | 2.89 |
| Dist. ASTM D–86: | |
| 5% | 505 |
| 50% | 516 |
| 95% | 541 |
| EP | 548 |
| Paraffins | 65.4 |
| One ring cycloparaffins | 12.4 |
| Two ring cycloparaffins | 7.0 |
| Three ring cycloparaffins | 5.6 |
| Alkyl benzenes | 2.7 |
| Indans, tetralins, styrenes | 3.0 |
| Indenes | 1.6 |
| Naphthalenes | 0.6 |
| Acanaphthalenes, biphenyls | 0.1 |
| Phenanthrenes, anthracenes | 0.1 |

We claim:
1. A method for synergistically increasing the yield of corn, comprising applying to the soil in which the corn is grown an effective amount of a mixture comprising:
 (A) 2 - chloro - 4 - ethylamino-6-isopropylamino-s-triazine;
 (B) a non-phytotoxic mineral oil composed of at least 90 percent by weight of paraffins and cycloparaffins; and
 (C) at least two members selected from the group consisting of ammonia, urea, and ammonium nitrate.
2. A method for synergistically increasing the yield of corn comprising applying to the corn plants and the unwanted vegetation an effective amount of a mixture consisting essentially of:
 (A) 2 - chloro - 4 - ethylamino - 6 - isopropylamino-s-triazine;
 (B) a non-phytotoxic mineral oil composed of at least 90 percent by weight of paraffins and cycloparaffins; and
 (C) at least two members selected from the group consisting of ammonia, urea, and ammonium nitrate.

References Cited

UNITED STATES PATENTS

| | | | |
|---|---|---|---|
| 3,290,139 | 12/1966 | Campbell et al. | 71—30 |
| 3,284,188 | 11/1966 | Amagasa et al. | 71—54 |
| 3,235,558 | 2/1966 | Harrison | 260—308 |
| 3,202,501 | 8/1965 | Pettersson et al. | 71—28 |
| 2,891,855 | 6/1959 | Gysin | 71—93 |

OTHER REFERENCES

L. C. Liv et al.: "Napthene and Paraffinic Oils as Adjuvants in Atrazine and Lindron Sprays for Weed Control in Corn," Proceedings of the Twentieth Annual Meeting of the Northeastern Weed Control Conference, pp. 309–315, January 1966.

Eastin et al.: "Effects of Atrazine and Hydroxatrazine on Nitrogen Metabolism of Selected Species," Weeds, vol. 15, No. 4 (1967), pp. 306–309.

LEWIS GOTTS, Primary Examiner

C. L. MILLS, Assistant Examiner

U.S. Cl. X.R.

71—93

PO-1050
(5/69)

UNITED STATES PATENT OFFICE
CERTIFICATE OF CORRECTION

Patent No. 3,551,131　　　　　　Dated December 29, 1970

Inventor(s) John M. Musselman, et al

It is certified that error appears in the above-identified patent and that said Letters Patent are hereby corrected as shown below:

Column 2: Line 53, "emulsiers" should be --emulsifiers--

Column 3: Line 34, "phosphorus" should be --phosphorous--

Column 4: Line 51, insert -- 3. The method of claim 1 wherein the components (A) and (B) are emulsified in an aqueous solution of (C). --.

Signed and sealed this 15th day of February 1972.

(SEAL)
Attest:

EDWARD M. FLETCHER, JR.
Attesting Officer

ROBERT GOTTSCHALK
Commissioner of Patents